US012770308B2

(12) United States Patent
Joshi et al.

(10) Patent No.: US 12,770,308 B2
(45) Date of Patent: Oct. 20, 2026

(54) COMPUTER-IMPLEMENTED SYSTEMS AND METHODS FOR MACHINE-LEARNING MODEL GENERATION OF COMPOSITE IMAGES

(71) Applicant: Canva Pty Ltd, Surry Hills (AU)

(72) Inventors: Bhautik Jitendra Joshi, Lewisham (AU); Oliver Daniel Richards, Northbridge (AU); Christopher James Cook, Ryde (AU); Karolina Pawlikowska, Sydney (AU); Joan Dyquiangco Magno, Waterloo (AU); Monika Rie Murata, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/176,881

(22) Filed: Apr. 11, 2025

(65) Prior Publication Data

US 2025/0336127 A1 Oct. 30, 2025

(30) Foreign Application Priority Data

Apr. 24, 2024 (AU) ................................ 2024202706

(51) Int. Cl.

*G06T 11/60* (2026.01)
*G06T 5/30* (2006.01)
*G06T 5/60* (2024.01)

(52) U.S. Cl.

CPC ................ *G06T 11/60* (2013.01); *G06T 5/30* (2013.01); *G06T 5/60* (2024.01); *G06T 2200/24* (2013.01); *G06T 2207/20081* (2013.01)

(58) Field of Classification Search

CPC ... G06T 11/60; G06T 5/30; G06T 5/60; G06T 2200/02; G06T 2207/20081

See application file for complete search history.

(56) References Cited

U.S. PATENT DOCUMENTS

2013/0235068 A1 9/2013 Ubillos et al.
2019/0325628 A1 10/2019 Dubey et al.

(Continued)

FOREIGN PATENT DOCUMENTS

AU 2023210625 A1 4/2024

OTHER PUBLICATIONS

Jamwal, V. et al., "Composite Diffusion: whole >= Σparts", arXiv preprint arXiv:2307.13720, published Jul. 25, 2023, https://arxiv.org/pdf/2307.13720, pp. 1-44.

(Continued)

*Primary Examiner* — Jin Cheng Wang
(74) *Attorney, Agent, or Firm* — GrowIP Law Group LLC

(57) ABSTRACT

Computer implemented methods and associated systems are described, which have particular application to image generation by machine learning models. A method of generating a composite image is described that is based on two images using a controlled machine learning model. A method of processing a composite image is also described which includes determining that a transition region of the composite image is similar to one of the images on which the composite image was based and using in the transition region visual elements from the basic image. A method for providing a user interface is also described. The method includes displaying representations of images generated using common input and different hyperparameters.

20 Claims, 5 Drawing Sheets

(56) References Cited

U.S. PATENT DOCUMENTS

| | | | | |
|---|---|---|---|---|
| 2020/0074722 | A1* | 3/2020 | Li (Lee) | G06T 15/503 |
| 2020/0097847 | A1 | 3/2020 | Convertino et al. | |
| 2021/0118112 | A1 | 4/2021 | Huang et al. | |
| 2021/0303921 | A1 | 9/2021 | Niu et al. | |
| 2022/0108417 | A1 | 4/2022 | Liu et al. | |
| 2022/0284590 | A1 | 9/2022 | Yang et al. | |
| 2023/0067026 | A1 | 3/2023 | Huts et al. | |
| 2023/0124252 | A1 | 4/2023 | Liu et al. | |
| 2023/0325996 | A1 | 10/2023 | Zhang et al. | |
| 2023/0377230 | A1* | 11/2023 | Stannus | G06T 7/50 |
| 2023/0384924 | A1 | 11/2023 | Al-Sharieh et al. | |
| 2023/0410337 | A1 | 12/2023 | Pugh et al. | |
| 2024/0005574 | A1 | 1/2024 | Zhang et al. | |
| 2024/0037881 | A1* | 2/2024 | Aggarwal | G06T 17/00 |
| 2024/0169624 | A1 | 5/2024 | Brandt et al. | |
| 2024/0169631 | A1* | 5/2024 | Kim | G06F 3/0481 |
| 2024/0169685 | A1* | 5/2024 | Figueroa | G06T 11/60 |
| 2024/0331163 | A1 | 10/2024 | Feng et al. | |
| 2024/0331247 | A1* | 10/2024 | Smith | G06T 13/40 |
| 2024/0338869 | A1* | 10/2024 | Zhou | G06T 11/60 |
| 2024/0362815 | A1 | 10/2024 | Joachim et al. | |
| 2024/0378832 | A1* | 11/2024 | Joachim | G06T 5/50 |
| 2025/0037415 | A1* | 1/2025 | Mishra | G06T 7/13 |
| 2025/0046055 | A1* | 2/2025 | Zhang | G06T 5/60 |
| 2025/0078349 | A1* | 3/2025 | Cho | G06T 11/60 |
| 2025/0209701 | A1* | 6/2025 | Hwang | G06T 11/60 |
| 2025/0308109 | A1* | 10/2025 | Nitzan | G06T 11/60 |
| 2025/0328997 | A1 | 10/2025 | Zhou et al. | |

OTHER PUBLICATIONS

Karsch, K., "Inverse Rendering Techniques for Physically Grounded Image Editing", arXiv preprint arXiv:2001.00986, published Dec. 25, 2019, https://arxiv.org/pdf/2001.00986, pp. 1-152.

Conlen, M., "Authoring and Publishing Interactive Articles", University of Washington, published 2021, https://digital.lib.washington.edu/researchworks/bitstream/handle/1773/48231/Conlen_washington_0250E_23699.pdf?sequence=1&isAllowed=y, pp. 1-190.

Evirgen, N., "Exploring User-Centric Generative Models: Advancing User Control, Comprehension, and Creative Capacity," Dissertation, UCLA, published 2023, https://escholarship.org/content/qt2bg09326/qt2bg09326.pdf?t=s5i14a, pp. 1-175.

Geng, A. et al., "Comparing Optimization Methods for Deep Learning In Image Processing Applications", tm—Technisches Messen (88.7-8), published May 2021, https://www.researchgate.net/profile/Claudia-Redenbach/publication/351332217_Comparing_optimization_methods_for_deep_learning_in_image_processing_applications/links/626855658e6d637bd1015bc5/Comparing-optimization-methods-for-deep-learning-in-image-processing-applications.pdf, pp. 1-13.

Molad, E. et al., "Dreamix: Video Diffusion Models are General Video Editors", arXiv preprint arXiv:2302.01329, published Feb. 2, 2023, https://arxiv.org/pdf/2302.01329, pp. 1-18.

Wikipedia, "Hyperparameter (machine learning)", published Dec. 19, 2023 (archived version), https://en.wikipedia.org/w/index.php?title=Hyperparameter_(machine_learning)&oldid=1190735416 (last visited May 22, 2025), pp. 1-4.

Lee, J. et al., "Compose and Conquer: Diffusion-Based 3D Depth Aware Composable Image Synthesis", arXiv preprint arXiv:2401.09048, pp. 1-23, Jan. 17, 2024, https://arxiv.org/pdf/2401.09048v1.

Li, R. et al., "FreePIH: Training-Free Painterly Image Harmonization with Diffusion Model", arXiv preprint arXiv:2311.14926, pp. 1-9, Nov. 25, 2023, https://arxiv.org/pdf/2311.14926.

Song, Y. et al., "ObjectStitch: Generative Object Compositing", arXiv preprint arXiv:2212.00932, pp. 1-17, Dec. 5, 2022, https://arxiv.org/pdf/2212.00932.

Zhang, X. et al., "Adaptive Convolution Kernel for Painterly Image Harmonization", 2nd International Conference on Intelligent Design and Innovative Technology (ICIDIT 2023), Atlantis Press, pp. 478-484, Oct. 10, 2023, https://www.atlantis-press.com/article/125992858.pdf.

* cited by examiner

COMPUTER-IMPLEMENTED SYSTEMS AND METHODS FOR MACHINE-LEARNING MODEL GENERATION OF COMPOSITE IMAGES

CROSS-REFERENCE TO RELATED APPLICATION

This application is a U.S. Non-Provisional Application that claims priority to Australian Patent Application No. 2024202706, filed Apr. 24, 2024, which is hereby incorporated by reference in its entirety.

FIELD

The present disclosure relates to the field of computer-implemented image processing techniques. The techniques may have particular application to image generation to produce new image data based on existing image data.

BACKGROUND

Historically, image editing and composition has been a complex and labour-intensive task, requiring specialized skills and tools. Traditional image editing workflows often involve tedious masking, lighting adjustments, and other manual techniques to composite disparate visual elements. A result is that artists and designers may struggle to incorporate new objects, textures, or styles into existing images while maintaining visual coherence and visual plausibility, whilst achieving this in a reasonable timeframe.

The advent of powerful machine learning (ML) models for image generation and manipulation has opened up new possibilities for more automated and flexible image composition. However, current image generation tools and image editing tools using ML models still have limitations. For example, they may require careful prompt engineering to achieve the desired results, and lack fine-grained control over the integration of new visual elements. There remains an ongoing need for further development in image processing technology for image generation.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

Computer implemented methods and computer processing systems configured to perform the methods are described. The methods relate to image processing techniques and have particular application to image generation by machine learning models.

A method of generating a composite image is described that is based on two images using a controlled machine learning model. The control of the machine learning model implements a subject-style dichotomy or content-style dichotomy, by providing as a basis of the control an appearance image and a content image.

In some embodiments, a computer-implemented method comprises:

by a computer processing system comprising an image processor:
- receiving a scene image, an object image, and a mask image;
- using at least one content image and at least one appearance image to guide or control an inference process of a controlled image generating machine learning model to generate visual elements for at least one area of a composite image, wherein the at least one area is dependent on the mask image;

wherein:
- the at least one content image is either the scene image or the object image, or is generated based on at least one of the scene image and the object image;
- the at least one appearance image is either the scene image or the object image, or is generated based on at least one of the scene image and the object image;
- the method comprises at least one of:
  - generating at least one said content image based on at least one of the scene image and the object image; and
  - generating at least one said appearance image based on at least one of the scene image and the object image.

In some embodiments a computer-implemented method for generating a composite image comprises:
- receiving a scene image, an object image, and a mask image;
- generating at least one content image based on the scene image and the object image and generating at least one appearance image based on the scene image and the object image; and
- using the at least one content image and the at least one appearance image to guide or control an inference process of a controlled image generating machine learning model to generate visual elements for at least one area of the composite image, wherein the at least one area is dependent on the mask image.

In some embodiments a computer-implemented method for generating a composite image comprises:
- receiving a scene image, an object image, and a mask image;
- generating at least one appearance image based on the scene image and the object image and generating at least one content image based on the appearance image; and
- using the at least one content image and the at least one appearance image to guide or control an inference process of a controlled image generating machine learning model to generate visual elements for at least one area of the composite image, wherein the at least one area is dependent on the mask image.

A method of processing a composite image is also described. The method of processing includes determining that a transition region of the composite image is similar to one of the images on which the composite image was based and in response to or based on the determination, using in the transition region visual elements from that image to replace the similar visual elements.

In some embodiments a computer-implemented method for processing a composite image comprises:
- receiving an output image and a scene image, wherein the output image was generated by a blending of the scene image with an object image;
- identifying at least one area of the output image that a) corresponds to an edge of the object image or an area of transition between the object image and the scene image and b) is similar to a corresponding area of the scene image;

modifying the output image in the identified at least one area to replace visual elements of the output image with visual elements from the corresponding area of the scene image.

A method for providing a user interface is also described. The method includes displaying representations of images generated using common input and different hyperparameters. A user can then select a generated image to perform a further action, which may for example and without limitation be display the selected image at a higher resolution, save the selected image, or output the selected image.

In some embodiments a computer-implemented method comprises, by a computer processing system comprising an image processor and a display device:

using an image generating machine leaning model provided by the image processor, generating two or more different output images based on common input, wherein the two or more different output images are generated using a corresponding two or more different sets of hyperparameters for the image generating machine learning model;

causing display, on the display device, of a representation of each of the output images and then receiving user input indicating a selection of a first output image of the output images; and in response to the user selection, taking an action with respect to the first output image.

Also described is non-transitory computer readable storage storing instructions to cause a computer processing system to perform the methods disclosed herein.

Further aspects of the present disclosure and further embodiments of the aspects described in the preceding paragraphs will become apparent from the following description, given by way of example and with reference to the accompanying drawings.

DETAILED DESCRIPTION

Some existing machine learning (ML) models for image processing and image generation can be operated to produce a new image that incorporates new visual elements, such as an image of an object, into an existing image. In the case of an object, the existing image then serves as a scene or background for the object in the new image. These models, with varying levels of success, address the problem of trying to seamlessly integrate the new visual element or elements with the existing image. Traditionally, incorporating new visual elements, such as new objects, textures, or styles into existing images has been a complex and labour-intensive task. In particular, it is a challenge to blend these new elements while maintaining visual coherence and plausibility.

The inventors have identified that some of the existing ML models lack fine-grained control. Current image processing tools that include ML models often require careful prompt engineering to achieve the required or desired results. Some users lack the ability to precisely control the integration of new visual elements and even for advanced users, the need for prompt engineering or multiple steps slows development. For example ML models may not maintain visual plausibility and visual consistency when blending disparate visual elements.

This disclosure describes an image processing framework. In some embodiments the image processing framework operates based on at least a partial separation of content and style or appearance. In particular, one or more images based on and representing content required for a new image and one or more images based on and representing the style or appearance required for the new image are provided as control inputs to an image generating ML model. Based on the one or more content images and one or more appearance images, an image generating ML model may achieve tasks like relighting, texture transfer, and edge blending to relatively seamlessly incorporate new visual elements into an image or relatively seamlessly otherwise combine two image documents.

The techniques disclosed here may have application to, for example, virtual photography, product visualization, visual effects, and image-based creative tools. By reducing the effort required to blend disparate visual elements, the techniques may enable users to rapidly explore and iterate on complex image compositions.

Figure 1:
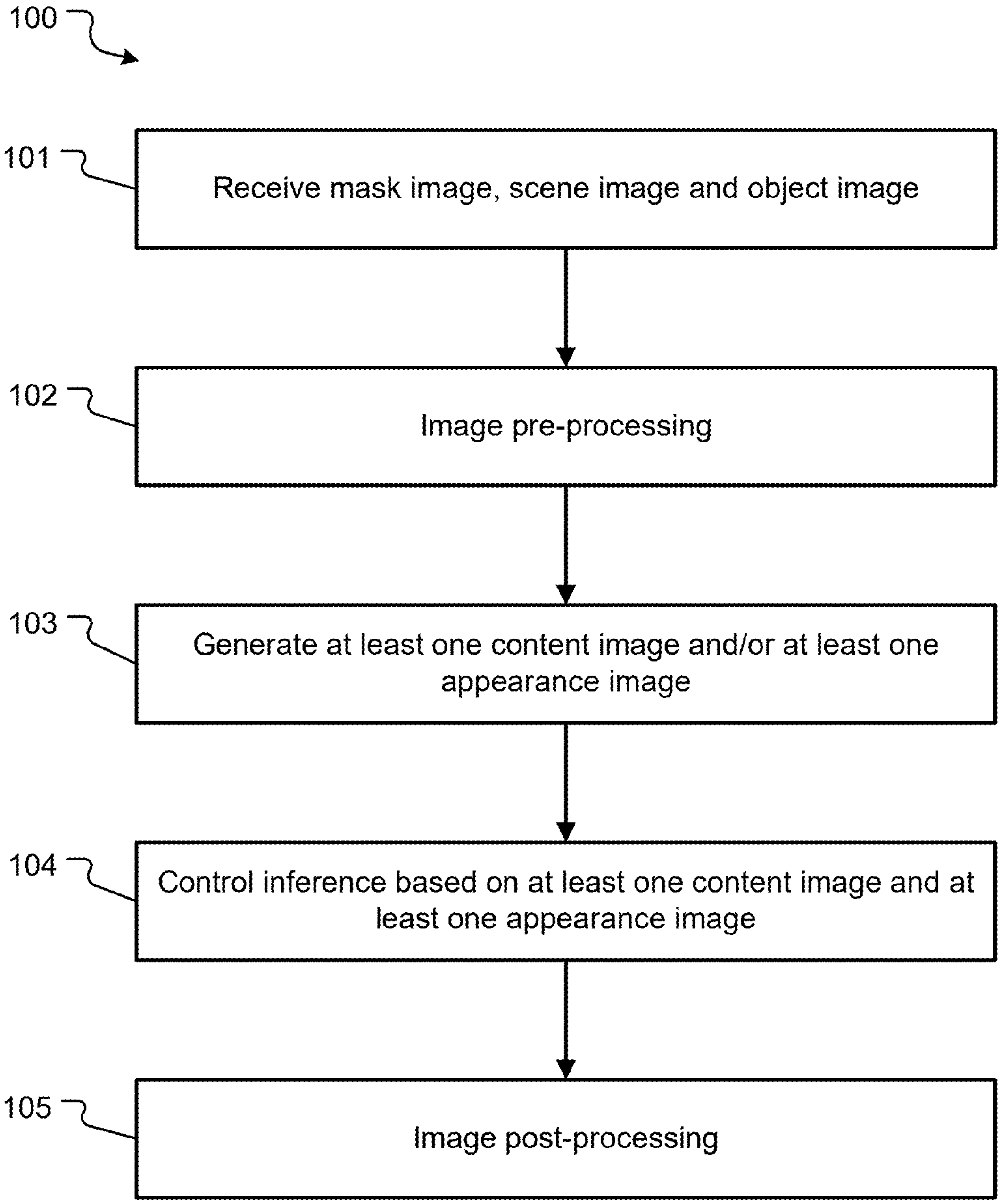
FIG. 1 shows a flow diagram of a computer-implemented method 100 for image generation.

FIG. 1 shows a flow diagram of a computer-implemented method 100. The method 100 is a method of image generation and may be performed by a computer processing system configured to perform the method, which configuration includes instructions implementing an image generating ML model. The method 100 has application to a range of image generating ML models. The image generating ML model may be a diffusion model. The image generating ML model may be a text-to-image diffusion model, which as described herein may be controlled to operate without a text prompt. The image generating ML model may be SDXL Turbo, Stable Diffusion 1.5, SDXL, available from Stability AI, SDXL with a latent consistency model (LCM), or another suitable model. Alternatively the image generating ML model may be a generative adversarial network (GAN).

The image generating ML model is guided or controlled. This guidance or control may be one or more control ML models, such as one or more neural networks configured to receive as an input images and use the images to influence the diffusion process or condition the diffusion output of the image generating ML model. The combination of an image generating ML model with one or more control ML models is referred to herein as a controlled image generating ML model. The input images include at least one content image, at least one appearance image and a mask image. As described below, in general the controlled image generating ML model is or has been configured by training and setting of hyperparameters so that the content and appearance images control what visual elements are generated and the mask image controls where the visual elements are generated.

The guidance or control may be by a multi-controlnet, for example ControlNet 1.1 available from Stability AI. The guidance or control may include an image prompt adapter such as IP-Adapter described in "IP-Adapter: Text Compatible Image Prompt Adapter for Text-to-Image Diffusion Models" by Hu Ye et al. arxiv:2308.06721 and made available by Tencent AI Lab. In a particular embodiment, a multi-controlnet, e.g. ControlNet 1.1., and an image prompt adapter, e.g. IP-Adapter, are both used, with the multi-controlnet receiving as input the at least one content image (see below) and IP-Adapter receiving as input the at least one appearance image (see below).

At step 101 an image processor of the computer processing system receives a mask image, a scene image and an object image. The scene image is an image that is to be modified by the computer processing system. The mask image defines the area in the scene to be changed. The object image is an image is used to influence the changed area in the scene. The object image is or contains material on which the new visual elements that are to be incorporated into the subject image are based.

The terms "scene", and "object" in "scene image" and "object image" are used as labels for the distinct images and are not intended to limit the nature of the images beyond their use in the method 100. For example the scene image may, but does not necessarily depict a scene such as a place. Similarly, the object image may be an image that is of or which contains one or more objects, but need not do so.

Each of the mask image, scene image and object image are identified as such so that the computer processing system knows which data defines which image. The identification may be, for example, by data associated with the data files defining the images, which data may be metadata of the image file or other data, for example data generated based on input (e.g. user input) identifying to the computer processing system the image as a mask image, a scene image or object image.

Each of these images may be defined by data in computer storage and step 100 then involves reading the data in the computer storage. The data defining the images may have been received by the computer processing system via a communication interface or generated by the computer processing system. Each of the images may be in a pixel format, for example RGB images and the following description assumes the images are in this format. This is not intended to preclude processing images in other formats.

One or more of the images may have been received by the computer processing and the others generated by the computer processing system. For example the one or both of the scene image and object image may have been received by the computer processing system and the mask image may have been generated by the computer processing system. Alternatively all images may have been received by the computer processing system or all images may have been generated the computer processing system.

In some embodiments the mask image is generated by the computer processing system based on input specifying the area in the scene to be changed. The input specifying the area in the scene to be changed may be received by the computer processing via a user interface or may be received over a communication interface or a combination of both, for example with a user operating a user interface device of a client device, which sends the input to a server device for processing. Taking the example of blending the object image and the scene image, a user may specify a location for the object image to be placed on the scene image. The computer processing system may then generate a mask, the mask indicating the non-transparent regions of the object image as the area in the scene to be changed, plus any additional area due to mask dilation (see below) in embodiments in which mask dilation is utilised.

In step 102, one or more of the received images are processed by the computer processing system in an image pre-processing step. The image pre-processing includes one or more of: a) cropping one or both of the scene and object images to their respective regions of interest; b) resizing one or more of the scene, mask, and object images to a target number of pixels for optimal inference performance; c) dilating the mask; and d) introducing transparency across one or more regions of the object image.

Each of these pre-processing steps may influence the image generation process of method 100. The cropping of the scene and object images to the region of interest reduces the number of pixels that are processed during inference. This allows more pixels from the region of interest to be passed to the controlled image generating ML model for inference (see below), allowing a higher resolution in the region of interest, in comparison to if the full images without cropping were provided. Additionally, if any of the images are not square, then they may be cropped to a square image if this is required by the controlled image generating ML model. The number of pixels may be too large for a size constraint (the size constraint may be a target size, a maximum size or an otherwise determined size constraint) of the controlled image generating ML model. Accordingly the image is resized to fit the size constraint, for example by down-sampling the image. If cropping of the image is performed, the image may be first cropped and then resized. The mask dilation, for example dilation by up to about 5 or 10 pixels or more, results in some overpainting during inference, which may improve edge quality. Transparency in the object image is utilised to indicate regions of the object image that do not contain new visual elements for the scene image. If transparency is introduced to the object image, this may be performed before cropping and resizing.

The pre-processing cropping of at least one of the images may be automatically performed. For example, a user of the computer processing system may, via a user interface of the computer processing system, specify a location or region in the scene image that defines where the new visual elements are to be incorporated. The computer processing system may then automatically determine a region (if a location is specified) or identify the specified region and then automatically crop the scene image at or near the bounds of the determined or identified region. Similarly, where the object image includes transparency (user specified, generated based on background removal, or as part of the image that is received) that forms a border around the edges of the object, the pre-processing cropping may automatically remove part or all of the transparent border.

The pre-processing resizing of at least one of the images may be automatically performed. For example, the computer processing system may determine a size of each received image and automatically down sample any image that is larger than a target size.

The pre-processing dilating of the mask may be automatically performed. For example, the computer processing system may apply image morphology techniques to automatically dilate the mask, or add a predetermined number of pixels around the border of the mask. Alternatively, step 102 may involve receiving user input to define the amount of dilation.

The pre-processing introduction of transparency may be automatically performed. Transparency can be generated by taking an image without transparency and applying background removal to infer it and step 102 may include automatically applying a background remover. Alternatively, step 102 may involve receiving user input to define the transparency, either alone or in conjunction with a suggested transparency by the computer processing system (e.g. based on what a background remove would remove) which is then offered for approval or edit.

Accordingly, in some embodiments step 102 is automatically performed by the computer processing system. The image pre-processing of step 102 may be initiated following receipt of the mask image, scene image and object image, together with any associated user input, for example user input specifying how the object image is to be utilised to incorporate new visual elements into the scene and user input indicating that the computer processing system should commence the image processing of the method 100.

In other embodiments, step 102 is omitted or the computer processing system may determine that pre-processing is not required and therefore omit it. For example there may be no need for pre-processing when the received mask, scene and object images are received in a suitable form for processing in steps 103 and 104 of method 100, having either been generated that way or previously subjected to pre-processing.

In step 103, the computer processing system generates at least one content image, at least one appearance image or at least one content image and at least one appearance image. The form of and combination of the at least one content image and at least one appearance image used for inference (see step 104) depends on the way in which the new visual elements from the object image are to be incorporated into the scene image. Different forms of image and different combinations of image result in different images being generated at inference, the different images incorporating the new visual elements from the object into the scene image in different ways.

In some embodiments the computer processing system is configured to generate only one particular combination of at least one content image and at least one appearance image. In other embodiments the computer processing system is configured to generate two or more combinations-in other words the computer processing system is configured to incorporate the new visual elements from the object into the scene image in any one of two or more different ways. Which combination is utilised may be based on user input, which user input may designated a particular visual effect or desired outcome or similar, which is associated with a particular combination of images used for inference. It will be appreciated that some combinations may be viewed as being likely to be more frequently or widely used than others, due to providing a visual effect or other outcome that is more commonly required.

One example of a particular visual effect or outcome is transferring the texture from a reference in the object image to re-colour a target object in the scene image, whilst maintaining the shape and lighting cues of the object in the scene image. Another particular example of a visual effect or outcome that may be relatively more frequently or wide used is blending an object into a scene, with the blending being performed so as to adapt to an estimated lighting of the area of the scene image into which the object is dropped into and a combination of generated content and appearance images is described herein to achieve that visual effect or outcome. More generally, the particular visual effects or outcomes may involve moving at least one of content and appearance from an object image into a scene image, while optionally adopting the appearance of the scene image.

When step 103 does not involve generating at least one appearance image, then the step includes either implicitly or explicitly designating either the scene image or the object image as the appearance image. When step 103 does not involve generating at least one content image, then the step includes either implicitly or explicitly designating the appearance image or the object image as the content image.

A generated content image is an image that represents image content or structure like objects and shapes. A generated content image omits some or all of the style characteristics of the image or images on which it is based, either entirely or in part, while still representing content or structure.

A generated appearance image is an image that represents image style characteristics, such as texture, colour, brushwork, lighting, overall aesthetic or other aspects of stylisation. The lighting may include general lighting, for example whether there are shadows and if so in what direction. The light may include specific lighting, for example where the image has the appearance of having an artificial light source off camera of a particular colour. A generated appearance image includes visual characteristics from both the scene image and the object image. A generated appearance image may also represent image content, in addition to the image style characteristics.

Accordingly, the one or more content images and the one or more appearance images create a form of subject-style dichotomy or content-style dichotomy. As described above, in some embodiments the depiction of the subject or content in the content images is without at least some of the style information or is without all or substantially all of the style information of the image or images on which it is based. The depiction of the style in the one or more appearance images may include all or substantially all of the subject or content of the image or images on which it is based.

By way of illustration, the content images may depict one or more of a) the shapes, objects, and structures present in an image, such as the outlines of a car, the geometry of a building, or the silhouette of a person, b) The spatial relationships and composition of elements within the scene, like the positioning and layout of objects, c) the underlying skeleton or framework of the visual information, without the specific surface details. As described herein, an algorithm suited to generating content images is the Canny algorithm and another example is a monocular depth estimation network. The present disclosure is not intended to be limited to these two examples of algorithms or methods for generating content images.

Also by way of illustration, the appearance images may depict one or more of (where applicable): a) the textures, colours, and material properties that define the visual aesthetics of objects and surfaces, b) the lighting conditions, shadows, and reflections that contribute to the overall mood and atmosphere of the scene, c) the artistic style, brushwork, or post-processing effects that convey a particular visual treatment or interpretation. A generated appearance image may be a combination of two images, in particular a combination of the scene image and the object image. The combination may be formed by a simple operation of pasting the object image over the scene image. Alternatively other image processing steps may be involved and a specific example is provided with reference to FIG. 2.

In some combinations of appearance and content images, a content image or set of content images is or are generated by image processing an appearance image or set of appearance images. The appearance image or images on which the content image or images is or are based may be generated appearance image(s), or may be the scene or object image designated as the appearance image.

In some embodiments step 103 is automatically performed by the computer processing system. This may follow automatic performance of step 102, as described above.

In step 104 inference by the controlled image generating ML model is performed to produce an output image, with the at least one content image, the at least one appearance image and the mask image used to control the inference. In some embodiments step 104 includes generating one output image and in other embodiments step 104 includes generating more than one output image using different hyperparameters. The control over the inference may be by driving an inference process of the ML model. The control may include control to cause the inference process to inpaint an image based on a mask. As described above, one or more control ML models, such a neural network ML models (e.g. ControlNet 1.1, IP-Adapter), may be trained and configured with hyperparameters in the usual manner to provide this control, with the at least one content image, the at least one appearance image used to control what visual elements are generated and the mask image used to control where the visual elements are generated.

The training of the controlled image generating ML model may have been end-to-end, with the gradients from the image generating ML model backpropagated through the control ML models. Alternatively, if the control data required from the control ML models is known the training may be in two stages. In a first stage the control ML models are trained on a dataset of image-condition pairs. The image generating ML model may then be trained, conditioned on the output of the control ML models.

The hyperparameters include the multi-controlnet weights, the strength of IP Adapter, the inference sizing parameters such as coherency count, the guidance scale (which may be set to 0) and the scale and number of iterations per render pass. The hyperparameters can be determined using experimentation in the usual manner.

In some embodiments the diffusion by the image generating ML model is a one-pass process to generate an output image. In other embodiments two-pass rendering is used in which the generation process is split into two steps. In the first pass, inference is performed based on a relatively large area of the at least one appearance image and at least one content image. For example, inference in the first pass may be based on the bounds of an area within the mask image that indicates the location for the new visual elements, plus a padding that extends outwardly towards the image boundary, ceasing at the image boundary if the boundary is reached. For example the amount of padding along each axis may be at least 5%, 10%, 15%, 20%, 25%, 30%, 35% or any value in between, or a padding specified in a number pixels such as at least 51, 102, 154, 205, 256, 307, 358 for image sizes of 1024 pixels.

In the second pass, the diffusion model takes the low-resolution output from the first pass and refines it using inference based on a relatively small area of the at least one appearance image and at least one content image. The relatively small area has bounds that are more closely aligned with the bounds of the area in which the new visual elements are to be generated, for example by having less padding or no padding.

In another embodiment, only the utilised area of the appearance image varies between the first pass and the second pass. In both passes the same area of the content image may be used. Similarly, the area utilised of the content image may vary and the area of the appearance image may remain constant, to achieve different effects.

Where the object image is located over the scene image, e.g. so as to be blended with scene image, the area for inference in the first and second passes may instead be based on the bounds of the object image or the bounds of the non-transparent parts of the object image. In some embodiments the first pass is at a relatively low-resolution and is generated using a relatively low number of diffusion steps. The second pass the diffusion model takes the low-resolution output from the first pass and refines it to produce a relatively high-resolution image. In other embodiments one or both of the resolution and the number of diffusion steps is or are the same in each pass.

At least in some implementations, the first pass may be effective to incorporate lighting and colour from the scene image, more so than if one pass was used at the relatively small area or if both passes were performed at the relatively small area. On the second pass a more detailed image is generated, which is based on the incorporated lighting and colour.

In some embodiments step 104 is automatically performed by the computer processing system. This may follow automatic performance of step 103, as described above.

In some embodiments the method 100 ends at step 104, at the completion of which the image processor of the computer processing system has generated the data for a new image, which can be output, for example by writing the data computer storage, communicating the data over a communication interface or displaying a representation of the image on a display based on the data. In other embodiments the method continues to step 105.

In step 105 image post-processing is performed. The image post-processing may include resizing the output image from step 104 to a size that matches the size of the scene image, for example by upscaling the image. The image post-processing may include compositing the output image (which may be an image for the inpainted region) into the scene image. The compositing process may include techniques to improve edge quality and blend the new content more seamlessly in comparison to a simple replacement of the pixels from the scene image with pixels from the output image.

In some embodiments, when the output image is a combination or blending of the object image with the scene image, the image post-processing includes adjusting the output image in areas that correspond to edges of the object image or corresponding to the area of transition between the object image and the scene image. The inference may have generated new visual elements at this transition that are not optimal, for example producing what appears to be a halo at the transition.

The adjustment of these new visual elements includes a process of detecting an area of the output image that has a similarity with the scene image above a threshold. If the area of the output image has a similarity above the threshold, then the new visual elements are replaced with visual elements from the scene image.

The area of the output image may be an individual pixel, in which case the post-processing proceeds on a pixel-bypixel basis. Alternatively or additionally, the area may be groups of pixels. The area may be at a location that corresponds to a transparent part of the object image or may be outside the bounds of the object image, or the area may traverse an area corresponding to the edge of the object image. The measure of similarity may be by any suitable metric, for example Euclidean Distance, L1 distance or another measure or a combination of measures. Where groups of pixels are considered, then a similarity threshold may be in the distribution of colours. In some embodiments there is a single threshold. In other embodiments there is more than one threshold and, for example, the scene image being used for the pixel or area instead of the new visual elements if any one of the thresholds is exceeded.

The problem of halos and other edge effects is not limited to the method 100. The post-processing adjustment of the output image is described herein with reference to step 104 of the method 100. However the post-processing adjustment may be used with other methods of blending or combining images. In other words, the post-processing may be applied to methods or combining images other than the method 100.

Figure 3:
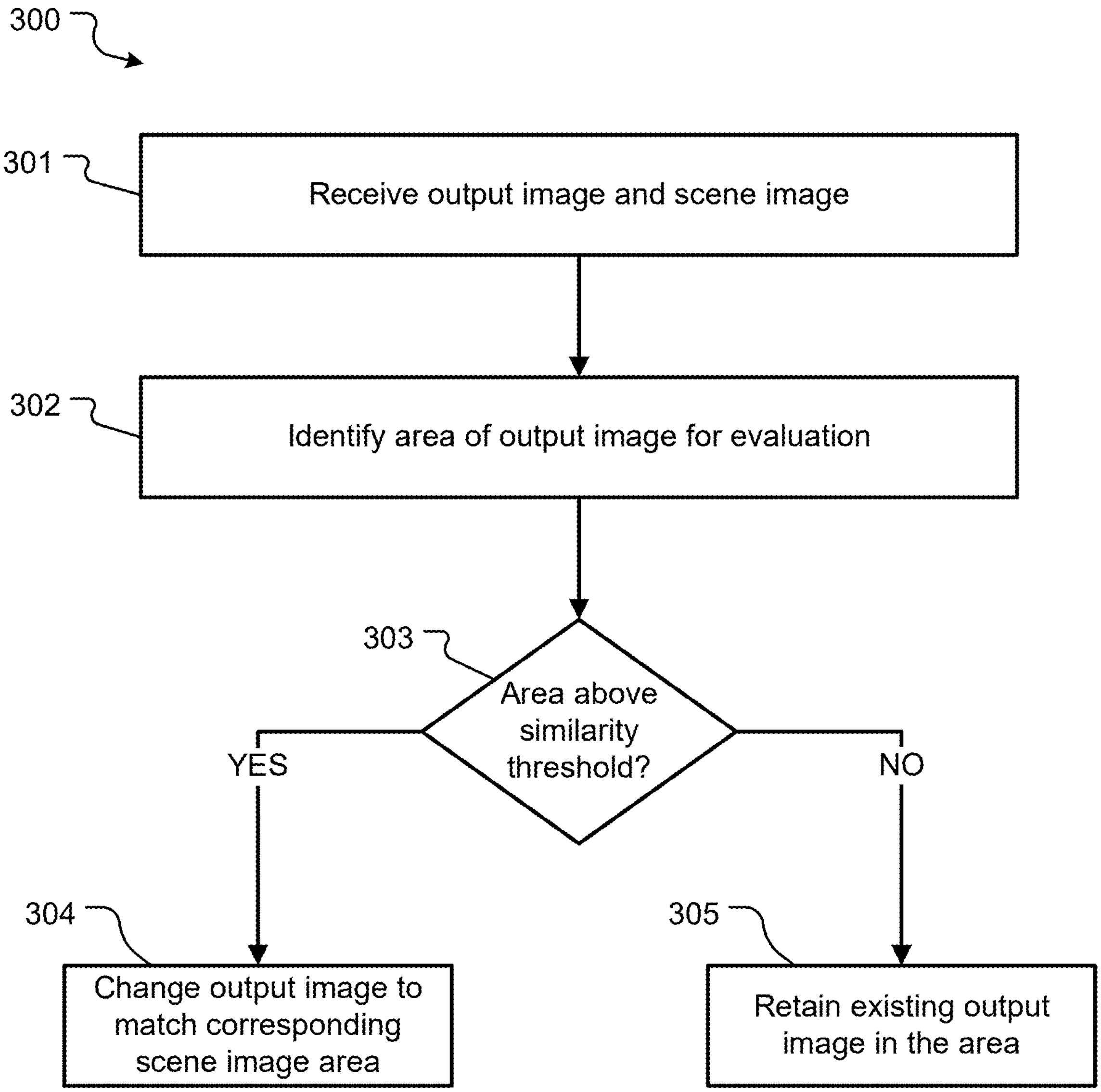
FIG. 3 shows a flow diagram of a computer-implemented method for post-processing or adjusting an output image that has been generated by a ML model based on a combination of two images.

FIG. 3 shows a flow diagram of a computer-implemented method 300. The method 300 is a method of post-processing or adjustment of an output image that has been generated by a ML model based on a combination of two images. The method 300 may be performed by a computer processing system configured to perform the method, which computer processing system may be, but is not necessarily the same as the computer processing system configured to perform the method 100.

In step 301 an output image and a scene image is received. The output image may be an image generated by step 104 of the method 100 or an composite image machine-generated by another method. Similarly, the scene image may or may not be scene image used in the method 100. The scene image is generally the image predominantly used to provide the visual elements for the background for the composite image.

In step 302 an area of the output image is identified for evaluation. The area may be a pixel or a group of pixels. The area is identified as an area that may have visual elements with transition or edge effects, as described above. The identification may be based on an object image (from the method 100) or similar, for example an area near the transition from a transparent portion of the object image and a non-transparent portion. Alternatively the identification may be based on comparing the output image and the scene image, for instance identifying where the two images differ over a threshold, indicating a transition to the object image or similar.

In step 303 the computer processing system determines at least one measure of similarity of the identified area of the output image with the corresponding area in the scene image. In some embodiments the measure of similarity may be a perceptual loss function. The loss may be calculated by passing both the output image and the scene image through a ML model trained to generate feature maps of images. The trained ML model ma be a convolutional neural network, such as VGG16 or VGG19. The loss may then be the Euclidean distance between the feature maps. Other measures of difference may be used, for example an average mean square error of the pixels in the identified area.

If the similarity is above a predetermined threshold for the at least one measure, then in step 304 the output image is modified to replace the visual elements in the identified area with visual elements from the corresponding area in the scene image. If the similarity is below the predetermined threshold or below all the predetermined thresholds if more than one, then in step 305 the output image is not changed in the identified area. Steps 302 to 305 may be repeated, for example so that collectively the entire transition region of a composite region is identified in step 302.

In some embodiments step 105 is automatically performed by the computer processing system. This may follow automatic performance of step 104, as described above. Accordingly, in some embodiments, after receiving input such as user input, that provides or specifies the scene image, the object image and the mask image or information sufficient to generate the mask image, the computer processing system may automatically complete steps 102 to 104, or 102 to 105, or 103 and 104, or 103 to 105. This automation may improve the user experience for at least some users, by reducing the number of inputs required or reducing the cognitive burden to produce images. Alternatively or additionally it may speed the production of at least an initial image or initial set of images, which can then serve the basis for further image processing.

Figure 2:
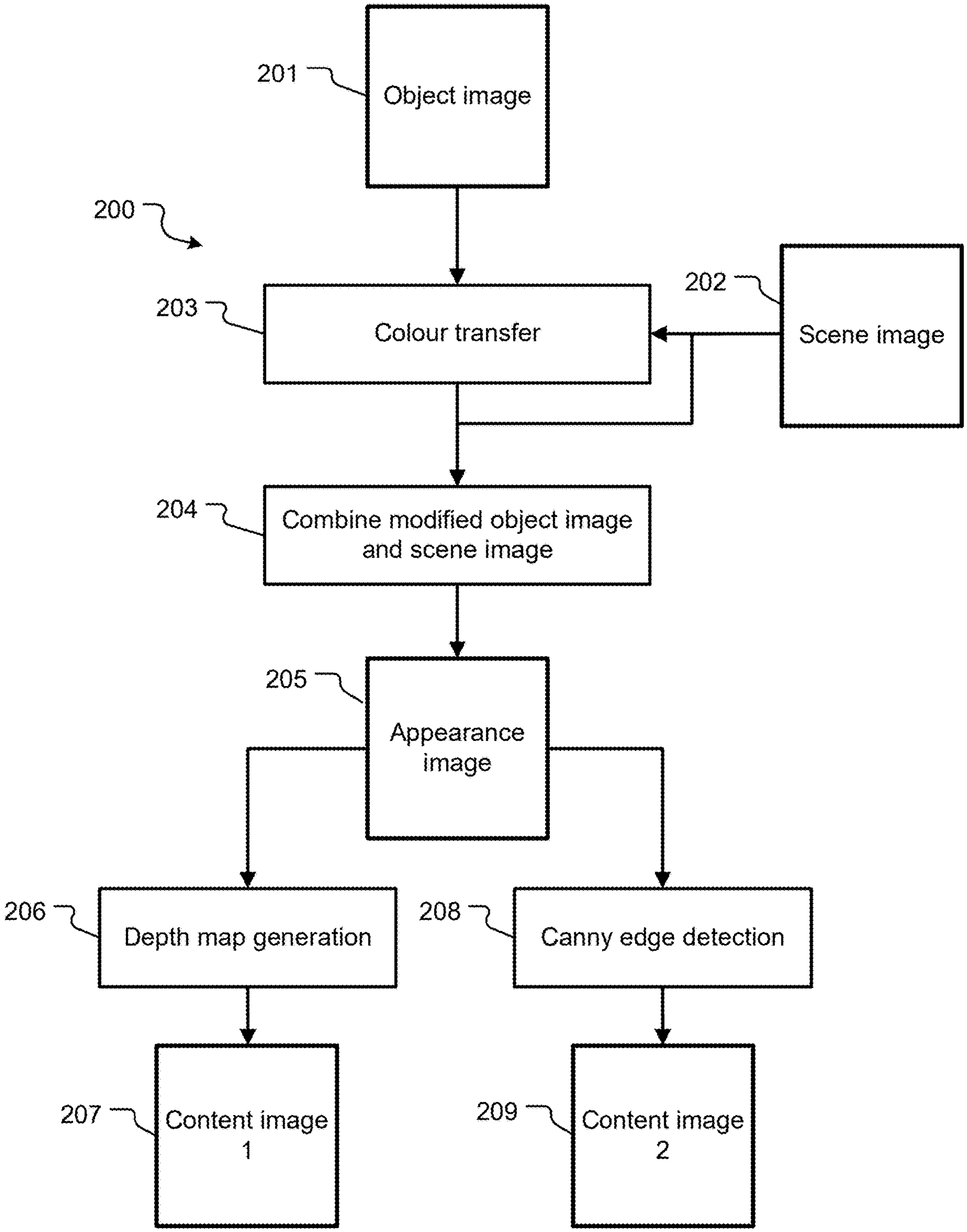
FIG. 2 diagrammatically represents a method for generating an appearance image and two content images.

FIG. 2 diagrammatically represents a method 200, for generating an appearance image and two content images. In FIG. 2 the processing steps of method 200 are represented by rectangles and images are represented by squares, which images may be data input into or output from the processing steps of the method 200. The method 200 is an example of step 103 of the method 100 and the method 200 will be described in that context.

An object image 201 and a scene image 202 is processed in step 201 to perform a colour transfer. The source image is the scene image and the target image is the object image. The object image 201 and the scene image 202 may be images received in step 101 of method 100, after the image pre-processing (if any) of step 102.

In some embodiments the colour transfer is a linear colour transfer. The colour transfer may include applying a linear transformation to the object image colour channels, to match the mean and standard deviation of the scene image colour channels. In other embodiments other colour transfer techniques are applied, for example utilising histogram balancing or a trained ML model.

In step 204 the scene image 202 and the image output from step 203 (the object image modified by the colour transfer, which is not shown in FIG. 2) are combined. The combination may consist of an overlay of the scene image with the modified object image, or may include additional image processing that preserves image style characteristics. The location of the object image may be at coordinates specified directly or indirectly by a user of the computer processing system, using a user interface of the computer processing system. The combined modified object image and scene image is an appearance image 205, that is an appearance image used for inference in step 104 of the method 100. In the embodiment depicted in FIG. 2 one appearance image is generated for use in the inference step of the method 100.

The appearance image 205 is used to create two content images 207, 209, that is content images generated for use, together with the appearance image 205, in the inference step of the method 100. The content image 207 is generated in step 206 by a depth map generation process. For example, the depth map generation process may be by a monocular depth estimation network. The content image 209 is generated in step 207 by a Canny edge detection process.

Figure 7:
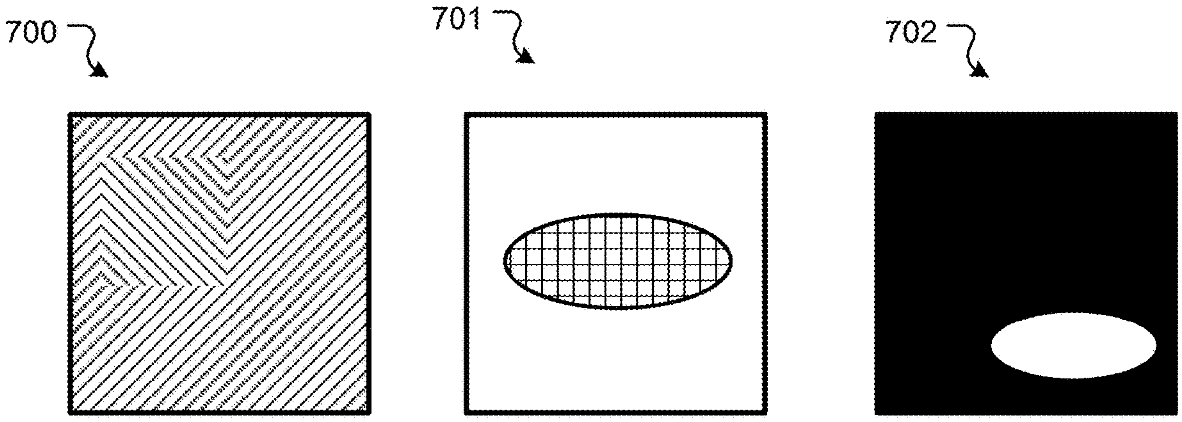
FIG. 7 shows an example scene image, an example object image, and an example mask image.

FIG. 7 illustrates three images. The image 700 may be designated a scene image, for instance the scene image received in step 101 of the method 100. The image 701 may be designated an object image, for instance the object image received in step 101 of the method 100. The ellipse and grid pattern within the ellipse represents an object and the white space outside the ellipse represents transparency. As previously described, the transparency may have been introduced using a background remover. The image 702 may be designated a mask image, for instance the mask image received in step 101 of the method 100. The image 702 may have been generated based on user input to locate the object image 701 over the image 700, optionally with a resizing, for example a size reduction so that the object image has smaller dimensions and therefore fits within a portion of the scene image. The white of the image 702 may have been generated to match or approximately match (e.g. as a result of matching and then adding dilation as described elsewhere herein) the non-transparent portions of the object image. The white region of the image 702 indicates to the combined ML model of the method 100 the region to be inpainted with new visual elements. In other examples there may be more than one white region in the mask image.

Figure 4:
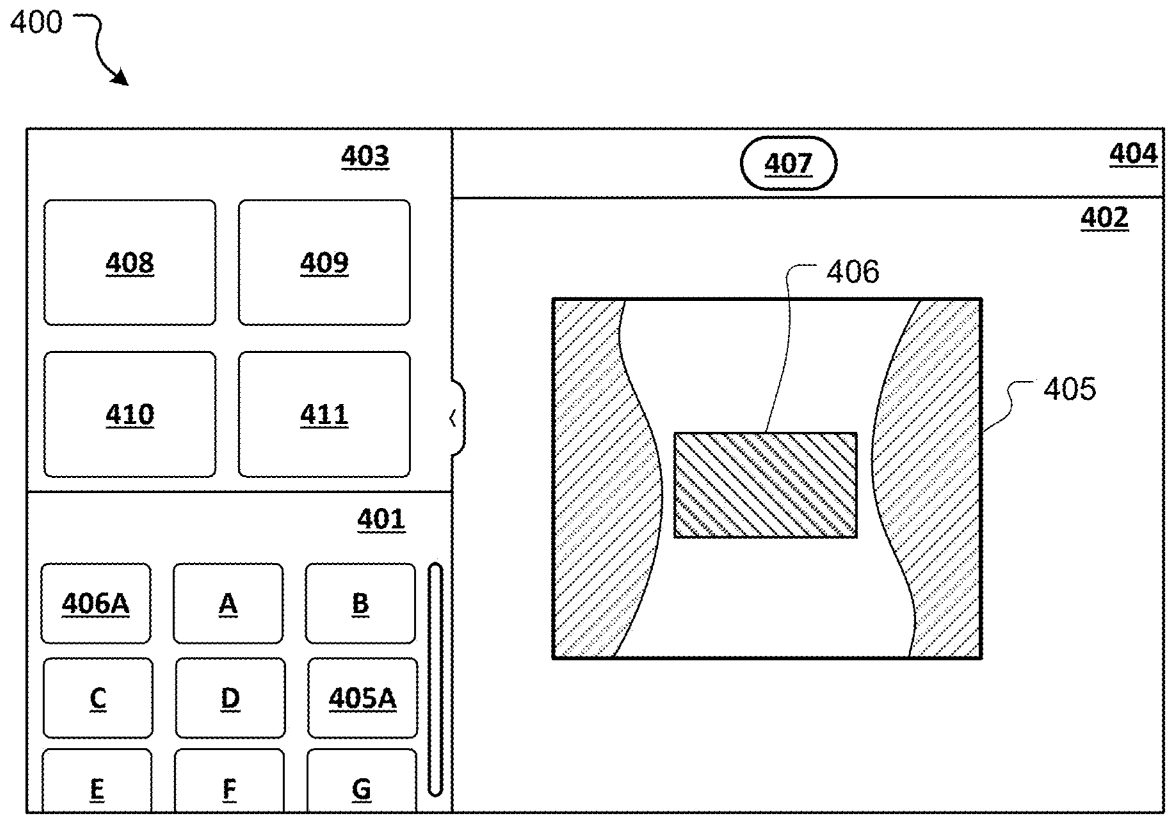
FIG. 4 illustrates an example screen display provided by a computer processing system.

FIG. 4 illustrates an example screen display 400. The screen display may be caused to be displayed by a computer processing system implementing the method 100 or the method 200 or the method 300. In this example the screen display includes four regions 401-404. The region 401 provides functionality to display and select images. Data defining the images may be stored in computer storage. The region 402 provides a canvas on which a user can view images, manipulate images and perform operations on or with respect to images displayed in the region 402. The region 403 displays results of the method 100. The region 404 includes selectable controls, including at least a control to initiate the method 100. It will be appreciated that many different configurations of screen displays may be designed and that functionality described with reference to the screen display 400 may be divided across two or more screen displays and additional functionality may be included that is not described.

The computer processing system may display in region 401 images, for example thumbnail images (a reduced size and resolution version of the image file that they relate to), representing image files available to the computer processing system. The user may select images based on region 401, for example by selecting thumbnails. In particular, the user may select one image to be a scene image for the method 100 and one image to be an object image for the method 100. Typically different images will be selected, although this is not essential. In the example of FIG. 4 the user selected thumbnails 405A and 406A. Other thumbnails that were available for selection are represented by letters A-G in FIG. 4.

Responsive to the selection of thumbnails 405A and 406A, image 405 and image 406 are displayed in the region 402 at a full resolution. The full resolution is a higher resolution than the thumbnail resolution. The full resolution may be with reference to a resolution of the display on which the screen display 400 is being displayed. The full resolution may match the resolution of the image file, when the display supports that resolution and is configured to display at that resolution. A user of the computer processing system can manipulate one or both of the images 405 and 406, for example to position and size one relative to the other. Other manipulation functions, including image editing functions may be provided. In FIG. 4 the image 406 has been placed over the image 405.

The user interface may also provide a functionality to designate a selected image as scene image and designate another selected image as an object image. For example a dialog box may request the user to select a scene image and another dialog box may request the user to select an object image. Alternatively the computer processing system may determine that a foreground image is an object image and a background image is a scene image.

The region 404 includes a selectable control 407. When the selectable control 407 is selected the computer processing system generates a mask image based on the image 405 (as a scene image) and the image 406 (as an object image) and initiates the method 100. In some embodiments the selectable control 407 appears in the region 404 responsive to selection of two images based on region 401 as described above. The selectable control 407 may appear when two images are displayed in region 402. The selectable control 407 may not be displayed when zero or only one image is displayed in region 402.

In some embodiments a single inference, that is step 104 of the method 100, is completed to generate one image, based on one set of hyperparameters. The hyperparameters may be fixed, or may be user adjustable, for example by selecting displayed controls such as sliders or the like (none being shown in FIG. 4). In other embodiments two or more inferences are completed with different hyperparameters to generate a corresponding two or more different output images. In the example of FIG. 4 four output images are generated. Representations of the generated output images, for example thumbnails 408, 409, 410 and 411 are displayed in the region 403. The user may select a thumbnail 408-411 and in response the computer processing system may display the corresponding generated output image, for example in the region 402 by replacing the display of the images 405, 406 with the output image.

By way of example, the set of hyperparameters for one inference may be set to largely preserve shape and appearance and the set of hyperparameters for another inference set to provide substantial flexibility to change shape and appearance. One or more other images, for example two images as per FIG. 4, may have hyperparameters set to different intermediate levels between those for preservation and those for substantial flexibility.

The screen display 400 and the user interface that it forms a part of may be applied to methods other than methods 100, 200 and 300. In particular, the screen display 400 and the associated user interface may be applied to any process of image generation by a ML model, where the image generation process is configured to generate a plurality of images using different hyperparameters. In some embodiments the ML model receives as input the inputs described with reference to the method 100. In other embodiments the ML model receives a different input, such as a text prompt, one or more other images or a combination of a text prompt and one or more other images.

Figure 5:
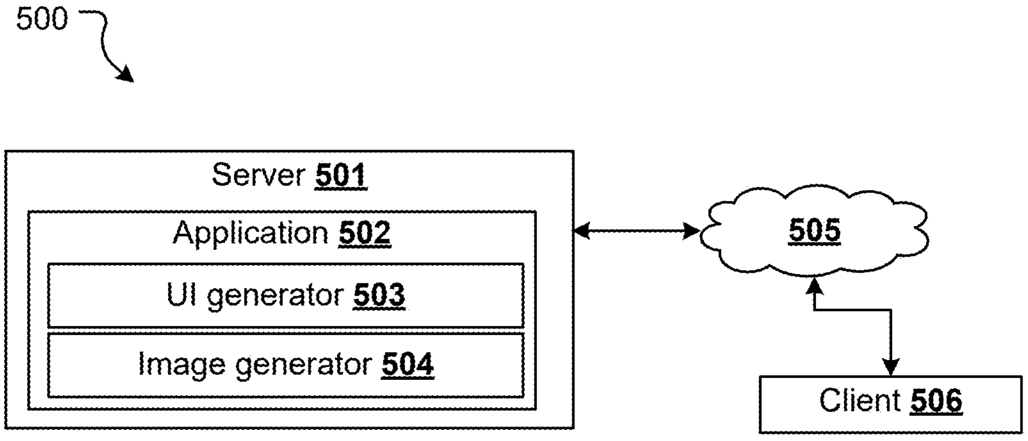
FIG. 5 shows a block diagram of an example computer processing system for performing the method of any of FIGS. 1 to 3 or causing display of the screen display of FIG. 4.

FIG. 5 shows a block diagram of an example computer processing system 500 for performing the method 100, the method 200 or the method 300, or any two or more of these methods. The computer processing system includes a server 501 including an application 502. The application 502 includes functionality to provide user interface (UI), represented by UI generator 503, and functionality to implement the method 100, represented by image generator 504. The application comprises instructions executable by an image processor to provide this functionality. It will be appreciated the server 501 will include other software components, such as an operating system, that are not shown.

The image processor may be a processing unit (e.g. see FIG. 6) suitable for processing images and perform the relevant method or a collection of processing units cooperating to provide the functionality. The UI generator 503 may cause the display of the screen display 400 by a hardware display and may receive user selections and other user input before, during or after the completion of the relevant method. The hardware display may be a display of a client 506, with which the server 501 communicates over a network 505. The network 505 may be a local or a wide area network.

The scene images and object images in relation to which the relevant method is performed may be originally stored on memory within or associated with the client 506 and communicated to the server 501, or in memory within or associated with the server 501. Similarly output images may be generated by the server 501 and communicated to the client 506. Whilst FIG. 5 shows a single client 506, there may be more than one client, potentially many clients communicating with the server 501, including communicating requests to perform the relevant method.

In other embodiments the method may be performed by a standalone computer processing system, rather than a computer processing system implementing a client-server architecture.

Figure 6:
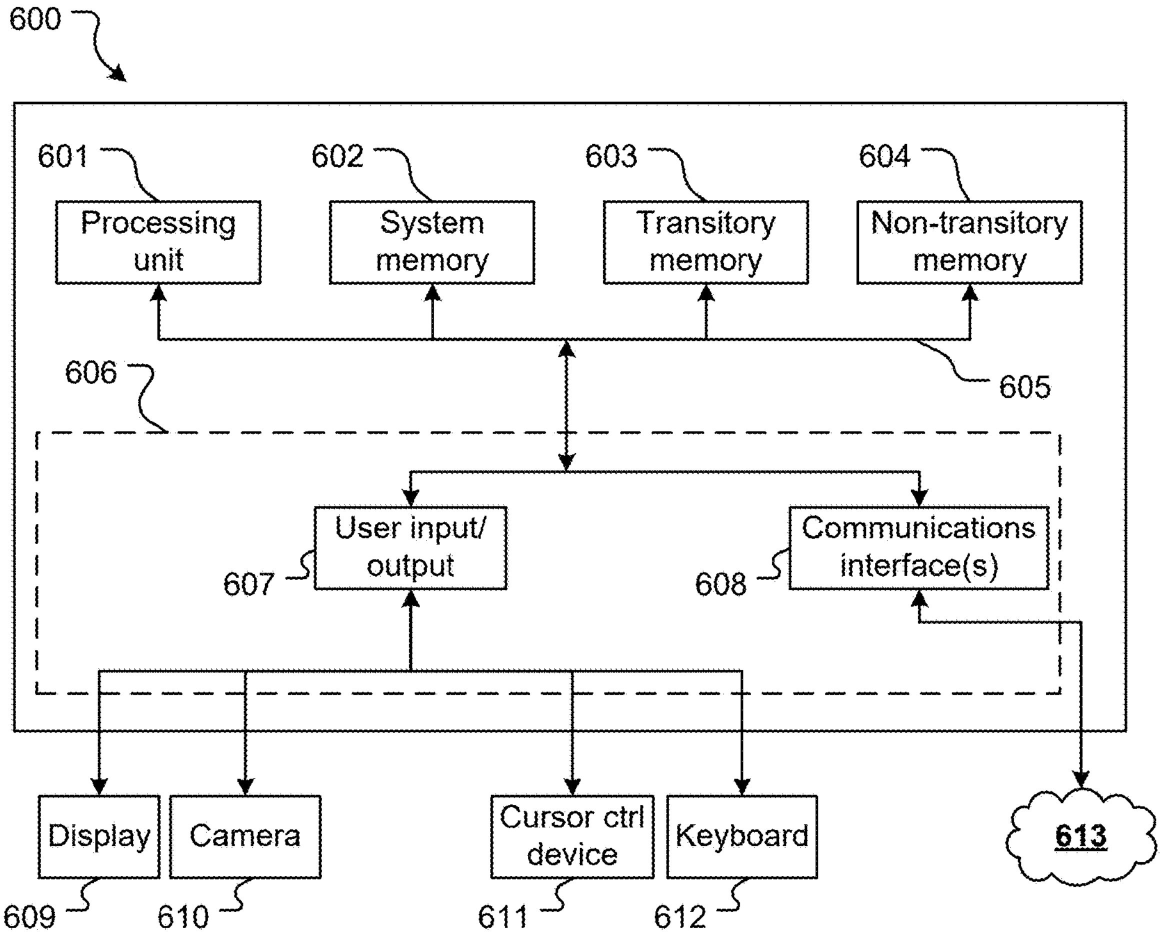
FIG. 6 shows a block diagram of another example computer processing system for performing any of the methods of FIGS. 1 to 3 or causing display of the screen display of FIG. 4.

FIG. 6 also shows a block diagram of an example computer processing system 600 for performing the method 100, the method 200 or the method 300, or any two or more of these methods, either in whole or in part. For example, the computer processing system 600 may be a standalone computer processing system for performing the relevant method or methods. Alternatively, the computer processing system 600 may be the server 501 of FIG. 5 (or a server of another system).

The computer processing system 600 includes a processing unit 601. The processing unit 600 is configured to be the image processor of the relevant method by instructions executable by the processing unit 600. The processing unit may include one or more than processing device, such as one or more central processing units or one or more central processing units and one or more graphics processing units. The processing unit may utilise system memory 602 and transitory memory 603 when performing the method. The instructions executable by the processing unit 600 may be stored in non-transitory memory 604. The processing unit 601 communicates with other devices of the computer processing system 600 over a bus 605.

The computer processing system 600 includes an input/output (I/O) interface 606. The I/O interface 606 may include a interface for user input/output 607 and a communication interface 608 for communication with a network 613. The network 613 may be the network 505 of FIG. 5. Example user input/output devices are shown in FIG. 6, including a display 609 (e.g. for displaying the screen display 400), a camera 610 (which may produce an image usable as a scene image or an object image), and a cursor control device 611 and keyboard 612 (which may be operated to interface with the selectable elements of the screen display 400).

It will be appreciated the computer processing system 600 will include other hardware components, such as a power supply that are not shown.

Example embodiments of the systems and methods of the present disclosure are provided in the following clauses.

Clause A1. A computer-implemented method comprising:

by a computer processing system comprising an image processor:

receiving a scene image, an object image, and a mask image;

using at least one content image and at least one appearance image to guide or control an inference process of a controlled image generating machine learning model to generate visual elements for at least one area of a composite image, wherein the at least one area is dependent on the mask image;

wherein:

the at least one content image is either the scene image or the object image, or is generated based on at least one of the scene image and the object image;

the at least one appearance image is either the scene image or the object image, or is generated based on at least one of the scene image and the object image;

the method comprises at least one of:

generating at least one said content image based on at least one of the scene image and the object image; and generating at least one said appearance image based on at least one of the scene image and the object image.

Clause A2. The method of clause A1, wherein the at least one content image represents the structure or content of at least one of the scene image and the object image, while omitting at least some style characteristics.

Clause A3. The method of clause A1 or clause A2, wherein the at least one appearance image represents style characteristics of at least one of the scene image and the object image.

Clause A4. The method of clause A3, wherein the at least one appearance image also represents the structure or content of the at least one of the scene image and the object image.

Clause A5. The method of any one of clauses A1 to A4, wherein the controlled image generating machine learning model comprises an image generating model and one or more control models that receive the at least one content image and the at least one appearance image as inputs to influence the generation of the visual elements.

Clause A6. The method of clause A4, wherein the one or more control models include a multi-controlnet and an image prompt adapter.

Clause A7. The method of any one of clauses A1 to A6, wherein the generating of the at least one content image and the generating of the at least one appearance image includes processing one or more of the scene image and the object image using techniques selected from the group consisting of: cropping, resizing, and transparency introduction.

Clause A8. The method of any one of clauses A1 to A7, further comprising generating the mask image by a process comprising receiving an initial image containing an initial mask and dilating the initial mask to form a mask of the mask image.

Clause A9. The method of any one of clauses A1 to A8, wherein the inference process of the controlled image generating machine learning model includes a two-pass rendering process, the first pass using a relatively large area of at least one of the at least one content image and the at least one appearance image, and the second pass following the first pass using respectively a relatively small area of at least one of the at least one content image and the at least one appearance image.

Clause A10. The method of any one of clauses A1 to A8, wherein the inference process of the controlled image generating machine learning model includes a two-pass rendering process, the first pass using a relatively large area of the at least one appearance image, and the second pass following the first pass using a relatively small area of the at least one appearance image.

Clause A11. The method of clause A10, wherein in the first pass a relatively large area of the at least one content image is used, and in the second pass a relatively small area of the at least one content image is used.

Clause A12. The method of clause A10 or clause A11, wherein the first pass incorporates lighting and colour characteristics from the scene image, and the second pass refines the image to a higher resolution.

Clause A13. The method of any one of clauses A1 to A12, wherein the controlled image generating machine learning model comprises a diffusion model.

Clause A14. The method of clause A13, wherein the diffusion model is a text-to-image diffusion model operating without a text prompt.

Clause A15. The method of any one of clauses A1 to A14, comprising repeating the generating inference process a plurality of times with different hyperparameters and generating a plurality of composite images, each composite image generated based on the inference process with different hyperparameters.

Clause A16. The method of clause A15, further comprising causing the display of a user interface and including in the user interface a selectable representation of each of the plurality of composite images, receiving a user selection of a said representation and in response displaying the composite image corresponding to the selected representation.

Clause A17. The method of any one of clauses A1 to A14, comprising generating the composite image.

Clause A18. The method of clause A17, wherein the composite image is generated to blend the object image into the scene image while adapting the appearance of the object image to the lighting and colour characteristics of the scene image.

Clause A19. The method of clause A17 or clause A18, further comprising post-processing the generated composite image by a process comprising:

determining that one or more areas of the generated composite image associated with a transition between the scene image and the object image in the generated composite image are similar to corresponding areas in the scene image; and replacing the one or more areas of the generated composite image with visual elements from the corresponding one or more areas of the scene image.

Clause A20. The method of any one of clauses A1 to A19, further comprising outputting data defining at least one said composite image to computer memory, to a display device or to a communication interface.

Clause A21. A computer-implemented method for processing a composite image, the method comprising:

receiving an output image and a scene image, wherein the output image was generated by a blending of the scene image with an object image;

identifying at least one area of the output image that a) corresponds to an edge of the object image or an area of transition between the object image and the scene image and b) is similar to a corresponding area of the scene image;

in response to the identifying, modifying the output image in the identified at least one area to replace visual elements of the output image with visual elements from the corresponding area of the scene image.

Clause A22. The method of clause A21, wherein the measure of similarity is based on one or more of Euclidean distance, L1 distance, and a colour distribution similarity between an area of the output image and a corresponding area of the scene image.

Clause A23. The method of clause A21 or clause A22, further comprising repeating the identifying, determining, and modifying steps for multiple areas of the output image, the multiple areas substantially covering all areas of transition between the object image and the scene image.

Clause A24. The method of any one of clauses A21 to 23, wherein each identified area is a single pixel or a group of pixels of the output image.

Clause A25. The method of any one of clauses A21 to A24, wherein the output image was generated by a machine learning model that combines the object image with the scene image based on a mask image.

Clause A26. The method of any one of clauses A21 to A24, wherein the output image was generated by a process comprising the method as claimed in any one of clauses 1 to 20.

Clause A27. A computer-implemented method comprising:

by a computer processing system comprising an image processor and a display device:

using an image generating machine leaning model provided by the image processor, generating two or more different output images based on common input, wherein the two or more different output images are generated using a corresponding two or more different sets of hyperparameters for the image generating machine learning model;

causing display, on the display device, of a representation of each of the output images and then receiving user input indicating a selection of a first output image of the output images; and in response to the user selection, taking an action with respect to the first output image.

Clause A28. The method of clause A27, wherein the representation of each of the output images is a thumbnail representation of each of the output images and wherein the action is causing display on the display device of the first output image at a full resolution.

Clause A29. The method of clause A28, wherein the representation of each of the output images is in a first region of a display screen and wherein the causing display of the first output image at the full resolution is in a second region of the display screen while the representation of each of the output images is displayed in the first region of the display screen, wherein the second region of the display screen is a different region to the first region of the display screen.

Clause A30. The method of clause A29, further comprising receiving user input indicating a selection of a second of the output images and in response to that user input replacing display of the first output image in the second region of the display screen with display of the second output image at a full resolution.

Clause A31. The method of clause A29 or clause A30, wherein the common input comprises at least one input image and wherein the method further comprises displaying in a third region of the display screen a representation of the at least one input image while the representation of each of the output images is displayed in the first region of the display screen and while the first output image is displayed in the second region of the display.

Clause A32. The method of any one of clauses A27 to A31, further comprising, before the generating of two or more different output images based on common input:

causing display on the display device a representation of each of a plurality of existing images;

receiving user input indicating a selection of at least one of the plurality of existing images; and forming the common input as consisting of or including the selected at least one existing image.

Clause A33. The method of clause A32, wherein the user input indicates a selection of two of the plurality of existing images and the forming the common input comprises forming a common input that includes the two existing images and information indicating how the existing images are to be combined.

Clause A34. The method of clause A33, wherein the information indicating how the images are to be combined comprises user input positioning the existing images relative to each other.

Clause A35. The method of clause A33 or clause A34, wherein the information indicating how the images are to be combined comprises user input sizing the existing images relative to each other.

Clause A36. The method of any one of clauses A33 to A34 further comprising causing the existing images to be displayed on the display device.

Clause A37. The method of clause A36, wherein the existing images are displayed in the second region of the display.

Clause A38. The method of clause A37, further comprising while the existing images are displayed in the second region of the display:

causing the display on the display device of a selectable control; and receiving a user selection of the selectable control;

wherein the generating of two or more different output images is by a process initiated in response to the user selection of the selectable control.

Clause A39. The method of any one of clauses A27 to A38, wherein the different sets of hyperparameters affect the flexibility of the ML model to change from an input to the ML model.

Clause A40. The method of any one of clauses A27 to A39, wherein the common input comprises at least one content image, at least one appearance image and a mask image and wherein generating each said output image based on the common input comprises using the at least one content image and the at least one appearance image to guide or control the image generating machine learning model to generate visual elements for at least one area of the output image, wherein the at least one area is dependent on a mask image.

Clause A41. A computer processing system comprising a processing unit and instructions in computer storage readable and executable by the processing unit to implement an imaging processing method, the image processing method comprising the method of any one of clauses A1 to A40.

Clause A42. Non-transitory computer readable storage storing instructions to cause a computer processing system to perform the method of any one of clauses A1 to A40.

Where in this specification a process is described as automatically performed by a computer processing system, this means that the computer processing system performs the process without requiring any user input that influences the process. For example, the computer processing system may receive a user input that directly or indirectly results in initiation of the process and then require no further user input to complete the process.

As used herein, except where the context requires otherwise, the term “comprise” and variations of the term, such as “comprising”, “comprises” and “comprised”, are not intended to exclude further additives, components, integers or steps.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A computer-implemented method comprising:

by a computer processing system comprising an image processor:

receiving a scene image, an object image, and a mask image, wherein the scene image, the object image and the mask image are distinct images; and implementing an automatic composite image generating process that comprises:

generating at least one appearance image based on both the scene image and the object image;

generating at least one content image based on the at least one appearance image, wherein generation of the at least one content image based on the at least one appearance image is by a generation process adapted to omit from the at least one content image at least part of some of the style characteristics of the appearance image, while still representing structure or content of the appearance image;

using the at least one content image and the at least one appearance image to guide or control, via one or more controlled machine-learning models, an inference process of a controlled image generating machine learning model to generate visual elements for at least one area of a composite image, to influence a diffusion process or condition a diffusion output of the controlled image generating machine learning model;

wherein:

the at least one area is dependent on the mask image.

2. The method of claim 1, wherein the at least one content image represents the structure or content of at least one of the scene image and the object image, while omitting at least some style characteristics.

3. The method of claim 1, wherein the at least one appearance image represents style characteristics of at least one of the scene image and the object image.

4. The method of claim 3, wherein the at least one appearance image also represents the structure or content of the at least one of the scene image and the object image.

5. The method of claim 1, wherein the at least one of the one or more controlled machine-learning models causes the inference process to inpaint based on the mask image and the object image.

6. The method of claim 1, wherein the generating of the at least one content image and the generating of the at least one appearance image includes processing one or more of the scene image and the object image using techniques selected from the group consisting of: cropping, resizing, and transparency introduction.

7. The method of claim 1, further comprising generating the mask image by a process comprising receiving an initial image containing an initial mask and dilating the initial mask to form a mask of the mask image.

8. The method of claim 1, wherein the inference process of the controlled image generating machine learning model includes a two-pass rendering process, the first pass using a relatively large area of at least one of the at least one content image and the at least one appearance image, and the second pass following the first pass using respectively a relatively small area of at least one of the at least one content image and the at least one appearance image.

9. The method of claim 1, wherein the inference process of the controlled image generating machine learning model includes a two-pass rendering process, the first pass using a relatively large area of the at least one appearance image, and the second pass following the first pass using a relatively small area of the at least one appearance image.

10. The method of claim 9, wherein in the first pass a relatively large area of the at least one content image is used, and in the second pass a relatively small area of the at least one content image is used.

11. The method of claim 9, wherein the first pass incorporates lighting and colour characteristics from the scene image, and the second pass refines the image to a higher resolution.

12. The method of claim 1, wherein the controlled image generating machine learning model comprises a diffusion model.

13. The method of claim 12, wherein the diffusion model is a text-to-image diffusion model operating without a text prompt.

14. The method of claim 1, comprising repeating the generating inference process a plurality of times with different hyperparameters and generating a plurality of composite images, each composite image generated based on the inference process with different hyperparameters.

15. The method of claim 14, further comprising causing the display of a user interface and including in the user interface a selectable representation of each of the plurality of composite images, receiving a user selection of a said representation and in response displaying the composite image corresponding to the selected representation.

16. The method of claim 1, comprising generating the composite image.

17. The method of claim 16, wherein the composite image is generated to blend the object image into the scene image while adapting the appearance of the object image to the lighting and colour characteristics of the scene image.

18. The method of claim 16, further comprising post-processing the generated composite image by a process comprising:

determining that one or more areas of the generated composite image associated with a transition between the scene image and the object image in the generated composite image are similar to corresponding areas in the scene image; and replacing the one or more areas of the generated composite image with visual elements from the corresponding one or more areas of the scene image.

19. The method of claim 1, further comprising outputting data defining at least one said composite image to computer memory, to a display device or to a communication interface.

20. The method of claim 1, wherein the composite image comprises a background and incorporated new visual elements and wherein the controlled image generating machine learning model predominantly uses the scene image to provide the generated visual elements for the background of the composite image about said at least one area and predominantly uses the object image to provide the generated visual elements for the incorporated new visual elements.

* * * * *